United States Patent [19]

Rubbert

[11] Patent Number: 5,100,085
[45] Date of Patent: Mar. 31, 1992

[54] AIRCRAFT WINGTIP VORTICITY REDISTRIBUTION APPARATUS

[75] Inventor: Paul E. Rubbert, Issaquah, Wash.

[73] Assignee: The Boeing Company, Seattle, Wash.

[21] Appl. No.: 458,844

[22] Filed: Dec. 29, 1989

[51] Int. Cl.⁵ .............................................. B64C 23/02
[52] U.S. Cl. ..................................... 244/199; 244/206
[58] Field of Search ........................ 244/199, 206, 130

[56] References Cited

U.S. PATENT DOCUMENTS

| | | | |
|---|---|---|---|
| 1,846,562 | 2/1932 | Longo et al. | 244/9 |
| 2,477,461 | 7/1949 | Lee | 244/199 |
| 2,485,218 | 10/1949 | Shaw | 244/130 |
| 2,927,748 | 3/1960 | Griswold II | 244/208 |
| 3,596,854 | 8/1971 | Haney, Jr. | 244/199 |
| 3,934,844 | 1/1976 | Reighart II | 244/199 |
| 3,984,070 | 10/1976 | Patterson, Jr. | 244/130 |
| 3,997,132 | 12/1976 | Erwin | 244/199 |
| 4,045,144 | 8/1977 | Loth | 244/199 |
| 4,533,101 | 8/1985 | Patterson, Jr. | 244/199 |
| 4,917,332 | 4/1990 | Patterson, Jr. | 244/199 |

FOREIGN PATENT DOCUMENTS 57646 3/1953 France .
1564026 3/1969 France .

OTHER PUBLICATIONS

"Turbines Recover Power by Dissipating Induced Drag from Wingtip Vortices", *Aviation Week & Space Technology*, Sep. 1, 1986, p. 199.

Primary Examiner—Joseph F. Peters, Jr.
Assistant Examiner—Anne E. Bidwell
Attorney, Agent, or Firm—Hughes & Multer

[57] ABSTRACT

A rotor is mounted to an aircraft wing to recover induced drag associated with a wingtip vortex. When the rotor is placed in the vortex stream, the transverse component of relative wind encountered at selected increasing spanwise locations along the blade changes sign due to an increasing transverse component of blade velocity and decreasing transverse component of vortex velocity with increasing distance from the axis of rotation. In order to maximize induced drag recovery, the blade is twisted in a spanwise direction so that the inner portion of the blade drives the blade, while the radially outward portion acts as a propeller to resist rotation. The induced drag recovery is in the form of thrust generated by the rotor blade.

24 Claims, 5 Drawing Sheets

AIRCRAFT WINGTIP VORTICITY REDISTRIBUTION APPARATUS

TECHNICAL FIELD

The present invention pertains to apparatus and methods for generating thrust from a vortex, and more particularly for recovering induced drag associated with aircraft wingtip vortices.

BACKGROUND OF THE INVENTION

It is common knowledge that an aircraft under lifting conditions sheds vorticity rearwardly from the wing. Under most flight conditions a strong swirling vortex is shed from the vicinity of each wing tip. These two vortices rotate in opposite directions. Downstream of the aircraft the air swirls in planes transverse to the direction of flight. There is kinetic energy associated with the transverse motion of the body of air downstream of the aircraft which is imparted by the passage of the aircraft. The aircraft does work on the air so as to impart this kinetic energy. The work done by the aircraft to produce the kinetic energy imparted to the air downstream is related to the product of the velocity of the airplane and the so-called induced drag of the airplane. This induced drag, namely the drag associated with the production of kinetic energy in crossflow planes downstream of the aircraft, is a significant portion of overall airplane drag.

The induced drag is related directly to the crossflow kinetic energy downstream of the aircraft. The transverse motion of the air far downstream of the aircraft can be related directly to the spatial distribution of trailing vorticity using the well-known Boit Sarart Law. Thus, there is a direct relationship between the distribution of trailing vorticity and the induced drag that is well known. Changes to the airplane which produce changes to the trailing vorticity also change the induced drag. If the change is such that the kinetic energy in planes transverse to the direction of flight is reduced, then the induced drag of the aircraft will also be reduced.

A number of conventional apparatus and methods have been proposed to reduce the induced drag. For example, it is known that increasing the span of the wing decreases induced drag. Winglet devices which extend above or below the wing tips have also been known to reduce induced drag.

Other conventional devices for reducing wingtip vortices have attempted to change the swirl pattern of the trailing vortices. For example, rotating devices positioned aft of the wingtips have been disclosed by Patterson in U.S. Pat. No. 4,533,101, in which a rotor is positioned in the crossfield flow of the vortex and is driven mechanically in a rotational direction opposite to the vortex swirl. Furthermore, Patterson, in U.S. Pat. No. 3,984,070, discloses a non-rotating device which has blades rigidly mounted in a direction which is transverse to the airstream.

Other conventional apparatus have attempted to generate a flow of a fluidized medium which either opposes or aids the rotational flow of the vortices. For example, in U.S. Pat. No. 2,477,461, by Lee, there is disclosed a device mounted at an aircraft wingtip which generates a rotational flow of a pressurized fluid to either oppose or aid the rotation of the tip vortex. Furthermore, Haney, Jr., in U.S. Pat. No. 3,596,854, discloses a wingtip chamber which gathers high pressure air that travels spanwise around the wingtip and causes this air to swirl inside the chamber and to exit the chamber where it interacts with the wingtip vortices to reduce induced drag.

Another example of conventional apparatus for reducing wingtip vortices includes Erwin, U.S. Pat. No. 3,997,132, which discloses the mounting of a jet engine at an aircraft wingtip to reduce the vortices generated thereat.

On the other hand, Reighart, in U.S. Pat. No. 3,934,844, discloses a vortex generator which produces lift for supporting an aircraft in flight.

In U.S. Pat. No. 2,485,218, by Shaw, there is disclosed a propeller which is mounted near an aircraft wingtip and which is mechanically driven in a rotational direction opposite to the wingtip vortices in order to reduce induced drag.

U.S. Pat. No. 2,927,748 Griswold, relates to an airfoil incorporating a blowing jet to control front and rear stagnation points.

U.S. Pat. No. 1,846,562 Longo et al, discloses a small rotating wing device mounted at the rear of the main wing for rotation about a spanwise axis, the intent of this being to increase lift.

An article in Sept. 1, 1986 Aviation Week and Space Technology, entitled "Turbines Recover Power by Dissipating Induced Drag from Wingtip Vortices" shows turbine blades which recover power from the wing tip vortex.

Other patents pertaining to wingtip mounted airfoil devices include French Patents 1,456,026 and 57,646.

SUMMARY OF THE INVENTION

The apparatus of the present invention is arranged for drag recovery from a vortex, and more particularly for drag recovery from a vortex which is generated at an outboard wing location.

The apparatus of the present invention comprises a propeller means which is rotatably mounted with its axis of rotation generally aligned with, and proximate to, the vortex center axis. The propeller means has an operating rotational speed, and also has a direction of propeller rotation which is the same as said direction of vortex rotation.

The propeller means comprises an inboard portion closer to the axis of rotation which is contoured and positioned so as to develop, when the propeller means is rotating at said operating rotational speed, a first rotational force component driving the propeller means in the direction of propeller rotation. The propeller means also has an outboard portion further from the axis of rotation, being contoured and positioned so as to develop, when said propeller means is rotating at said operating rotational speed, a second rotational force component opposing rotation of said propeller means in said direction of propeller rotation.

In the preferred form, the propeller means is mounted for freewheeling rotation, and the first and second rotational force components substantially balance one another. Also, the propeller means is arranged so as to develop an axial thrust component parallel to said axis of rotation.

The propeller means has a force cross over location spaced radially outwardly from the axis of rotation, with the propeller outboard portion being radially outwardly of said force cross over location, and said propeller inboard portion being located radially inwardly of said force cross over location. The propeller means has a zero incidence propeller location where a chordwise axis of said propeller means is parallel to the axis of rotation. In the preferred form the zero incidence propeller location is located radially inwardly of the force cross over location.

Further, the propeller means has a relative wind zero location where a rotational velocity component of said component means is substantially equal to a rotational velocity component of said vortex at said relative wind zero location. The relative wind zero location is, in the preferred embodiment, located radially inwardly from the force cross over location. Further, in the preferred form, the relative wind zero location is spaced radially outwardly from said zero incidence propeller location.

In the preferred embodiment, the propeller means comprises blade means having a leading edge, a trailing edge, a spanwise axis, and a chordwise axis which varies angularly relative to the axis of rotation from a radially inward location to a radially outward location. The chordwise axis makes with an adjacent line parallel to the axis of rotation a reference angle.

The blade means comprises an inboard blade section where the chordwise axis of the blade means extends from the trailing edge portion in a direction which is forward and opposite to the propeller direction of rotation, with the reference angle of the inboard section decreasing in a radially outward direction. There is an outboard section where the chordwise axis extends from the trailing edge of the blade means in a direction which is forward and toward the propeller direction of rotation, with the reference angle increasing in the outboard section in a radially outward direction.

In the method of the present invention, a propeller means is provided as indicated above, and positioned in a vortex generated by an aircraft. The inward portion of the propeller means is rotated in the direction of vortex rotation in a manner to act as a turbine and drive the propeller means in the direction of propeller rotation, and the outboard portion of the propeller means acts, relative to vortex, to retard rotation of the propeller means in the direction of propeller rotation. A net forward thrust is generated by the propeller means.

Other features of the present invention will become apparent from the following detailed description.

BRIEF DESCRIPTION OF THE DRAWINGS

These and other objects and advantages of the present invention will become more readily apparent upon reading the following Detailed Description and upon reference to the attached Drawings of which.

While the present invention is susceptible to various modifications and alternative forms, specific embodiments thereof have been shown by way of example in the Drawings and will herein be described in detail. It should be understood, however, that is it not intended to limit the invention to the particular forms disclosed, but on the contrary, the invention is to cover all modifications, equivalents, and alternatives falling within the spirit and scope of the invention.

DETAILED DESCRIPTION

The present invention pertains to a rotary device which recovers a portion of the induced drag associated with the vorticity shed by a lifting wing. In the preferred embodiment the rotary device operates in the vortex in a manner that it freewheels on a supporting shaft without generating any net work. In an exemplary embodiment, the rotary device is located downstream of the tip of a lifting body such as a wing. Drag recovery results from thrust generated by the rotary device.

Figure 1:
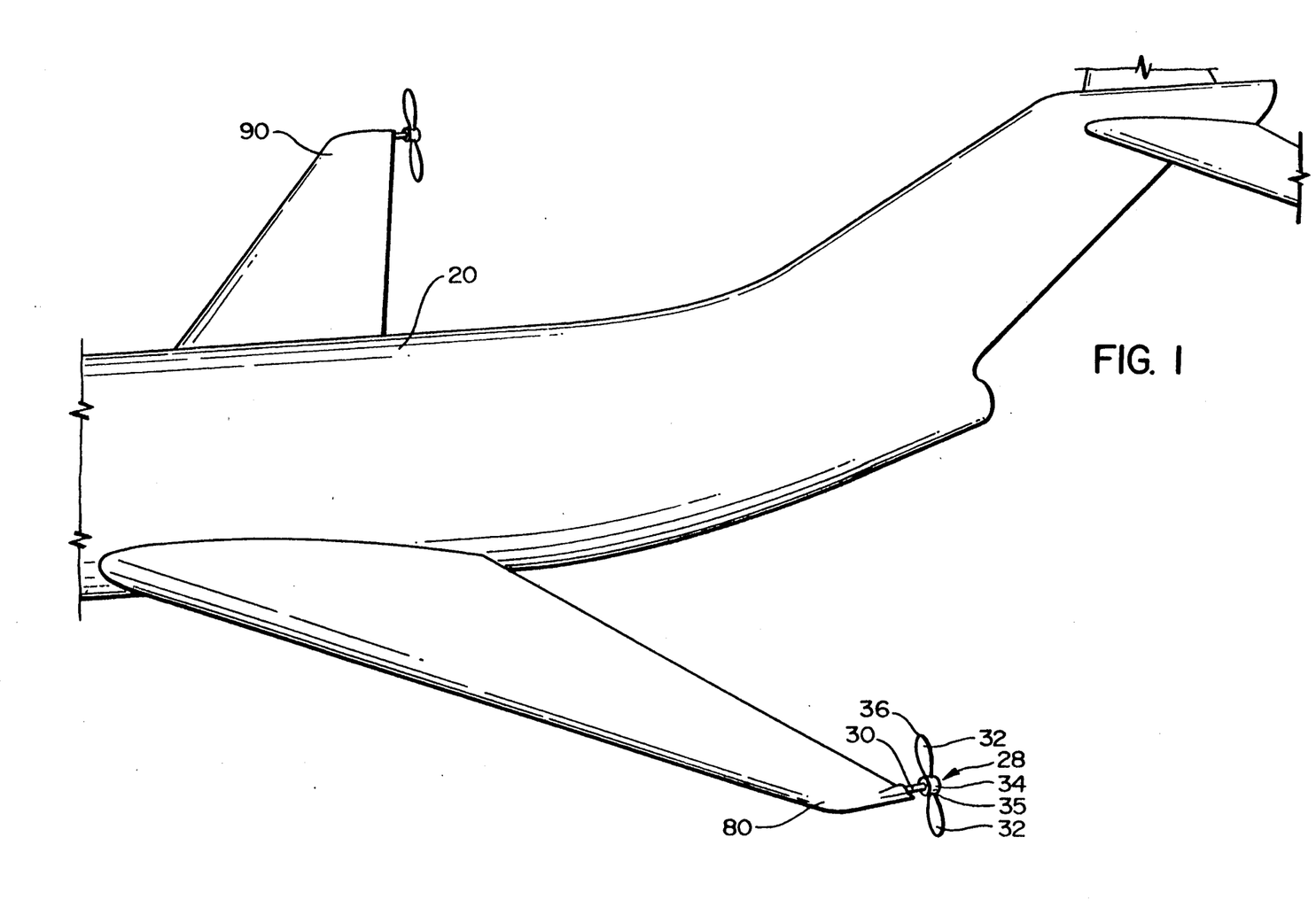
FIG. 1 is a pictorial representation of a exemplary embodiment in which the apparatus of the present invention extends rearward from a trailing edge of an aircraft wingtip.

In order to recover a portion of the induced drag, there is provided in the present invention a rotor indicated at 28 (FIG. 1) which is rotatably connected to a shaft 30 which in turn is connected to an aircraft wing near the wingtip. In a preferred embodiment, the rotor 28 and the shaft 30 extend rearwardly from the wing so that the shaft 30 is axially aligned with the vortex axis and the rotor 28 rotates in the same direction as the vortex. The rotor 28 includes a pair of blades 32 which are attached to a hub 34 at a root location 35. Each blade has a radius R as measured between the axis of rotation and the outer tip 36 of the blade 32. In order to maximize the thrust generated by the rotor, the blades 32 have a twisted spanwise configuration. Since the direction of relative wind to the blade 32 changes spanwise across the blade, a twisted blade optimizes the angle of attack of the blade.

In order to understand the present invention it is necessary to examine the wingtip vortex, as well as the aerodynamics of a rotor at various spanwise locations along the blade. The velocity induced by the vortex at an imaginary point P at a radius r from the vortex axis, and referred to herein as the transverse component of vortex velocity, varies as an inverse function of the distance of point P from the vortex axis of rotation. That is, as the distance from the axis of the rotation increases, the transverse component of vortex velocity, identified herein as $V_\theta$, decreases in a manner shown in FIG. 2, except for an increase in $V_\theta$ from zero to a maximum value at the outer edge of the core of the vortex, whose lateral dimension is typically small.

To understand the influence of $V_\theta$ on the operation of a wingtip rotor, reference is now made to the rotor 28 (FIG. 3) having a pair of twisted blades 32. When the rotor 28 is placed at the axial center of a vortex trailing downstream from the wing tip, the transverse component of the vortex velocity $V_\theta$ is found to vary spanwise across the blade between the root 35 and the tip 36. More particularly, the velocity $V_\theta$ is greater near the blade root 35 than at the blade tip 36.

It is further recognized that while the blade rotates at an angular velocity $\omega$, the velocity of an imaginary point P' on the blade varies as a function of spanwise distance r. This transverse component of blade velocity, identified herein as $\omega \cdot r$, where r=spanwise distance from the axis of rotation, increases with increasing blade radius. Thus, as shown in FIG. 2, the transverse component of blade velocity is greatest at the blade tip 36.

It should be further understood that the relative wind to an observer attached to the blade, $V_{RW}$ (FIG. 4) at any selected spanwise location of the blade 32, is a resultant vector of i) the free stream velocity, $V_{FS}$, which is generated by forward movement of the aircraft through the air, as well as ii) the difference, $V_{\theta-\omega \cdot r}$, between the transverse component of vortex velocity and the transverse component of blade velocity at the selected spanwise location. This difference, $V_{\theta-\omega \cdot r}$ is referred to herein as the transverse component of relative wind, and will be discussed later in further detail.

Figure 2:
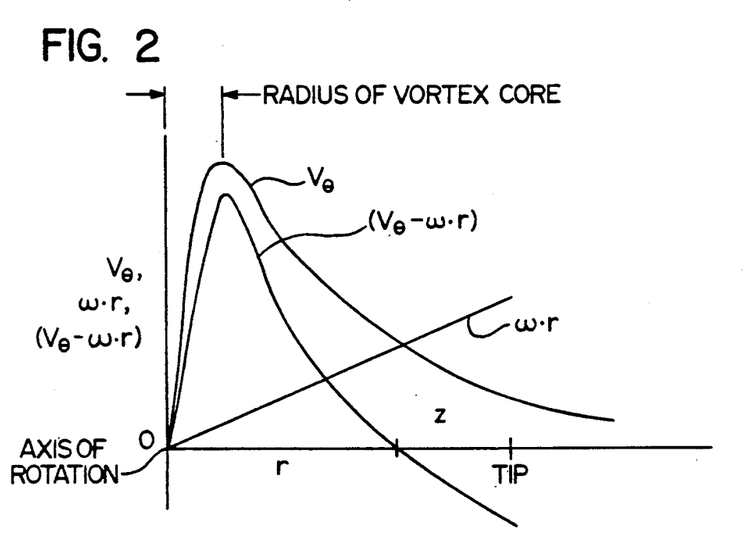
FIG. 2 is a graph of i) a transverse component of vortex-induced air velocity $V_\theta$, ii) a transverse component of blade velocity, $w \cdot r$, and iii) a transverse component of relative wind, $V_{\theta-w \cdot r}$, all as a function of a distance r from the axis of rotation of the blade.

It is apparent from FIG. 2, that the transverse component of relative wind changes direction at a spanwise location along the blade between the tip and the root. More particularly, as the distance r from the axis of rotation increases, the velocity, $V_\theta$ decreases, while the transverse component of blade velocity, $w \cdot r$, increases. This results in the transverse component of the relative wind decreasing to zero (designated by the letter "z" at FIG. 2) and then increasing in the opposite direction outboard of the location "z".

As with any wing that generates lift, it is desirable that the blade be twisted so as to provide an optimum spanwise distribution of angle of attack to the relative wind. Angle of attack at any radial position r is defined herein as an angle formed by the intersection of the wing chord at that radial position and the relative wind. To achieve an optimum angle of attack along the blade, the blade 32 of the present invention shown in FIG. 3 has a twisted configuration. More specifically, the rotor 28 includes hub 34 which is mounted for rotation abut an axis designated by the line 38. The hub has an outer surface 39 to which there is attached a pair of blades 32 which are mounted to the hub 180° apart from each other. It should be appreciated that additional blades 32 may be added, but at the expense of additional weight and skin friction. Each blade includes a leading edge 40 and a trailing edge 41, as well as an inboard spanwise portion 42, and an outboard spanwise portion 44 which is separated from the inboard portion by an intermediate portion 46. The inboard portion 42 is defined as the spanwise portion of the blade located between the hub surface 39 and the intermediate portion 46, while the outboard portion is defined as the spanwise portion of the blade between the intermediate portion 46 and the blade tip 36.

Figure 5:
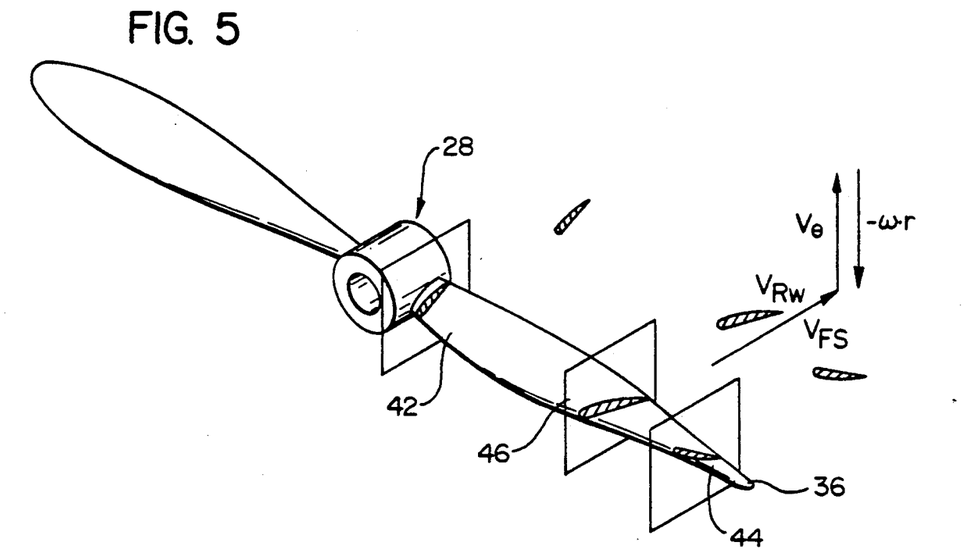
FIG. 5 is a diagram, similar to that of FIG. 4, of the vector components at an intermediate span location on the blade of a port rotor where the direction of the relative wind is essentially parallel to the free stream.

In order to define the twist of each blade, an inboard twist angle or reference angle $\gamma_1$ (FIG. 3) is formed by the intersection of i) an imaginary reference line 56, which is a line extending forwardly from the trailing edge 41 at a specific spanwise location with the reference line 56 being parallel to the axis 38, and ii) a chordline 58 of a selected cross section of inboard blade portion 42. Similarly, an intermediate reference angle $\gamma_M$ is formed by the intersection of the reference line 56 and a chordline 62 of a selected chordwise cross section of the intermediate portion 46. (Since the reference line 56 and the chordline 62 are coincidental, $\gamma$ M equals zero, and this is called the zero incidence point.) Furthermore, an outboard reference angle $\gamma_O$ is formed by the intersection of i) a reference line 56 which is coincident with the trailing edge of the outboard portion 44, and ii) a chordline 66 of a selected chordwise cross section of the outboard blade portion 44. The location of the intermediate angle $\gamma_M$ is called the "intermediate spanwise location" and located a short distance inboard of the location "z" (see FIG. 2), which is designated as the "relative wind zero location" and which is also shown in FIG. 5. As will be described later herein, at the location of the intermediate angle, $\gamma_M$, and also at the "relative wind zero location" the blade 32 in its preferred configuration, is generating a lift force which is driving the blade 32 in the direction of rotation of the vortex, so that at that location the blade 32 is acting as a turbine. There is on the blade 32 a crossover point where the lift generated by the blade 32 is zero, and this crossover point is located outboard on the blade 32 from the "relative wind zero location", These particular locations can vary, of course, depending upon specific design considerations.

Figure 3:
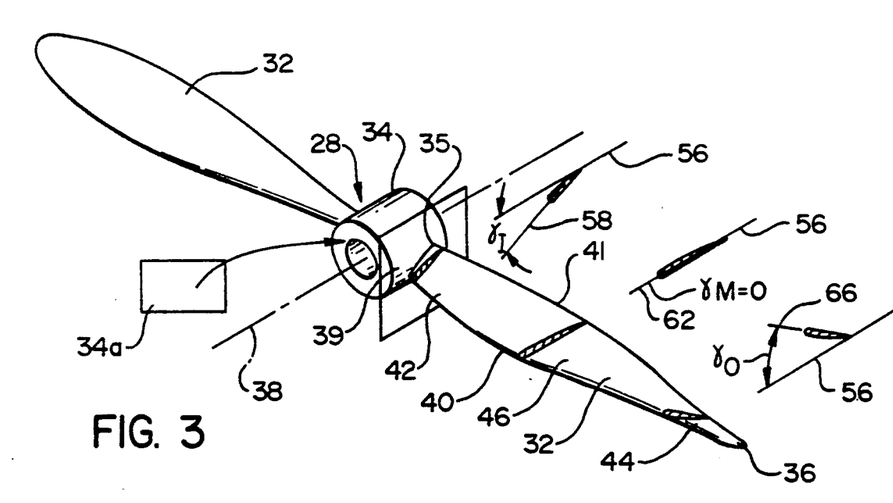
FIG. 3 is an isometric view of an exemplary rotor of the present invention where twist angles $\gamma_I$ and $\gamma_O$ are shown.

In order to maximize the induced drag recovery, it is desirable to optimize the angle of attack of the blade at every spanwise location along the blade. It is recognized that the direction of the transverse component of relative wind, $V_{\theta-\omega \cdot r}$, across the blade changes sign with increasing spanwise distance r. That is, $V_{\theta-\omega \cdot r}$ decreases to zero, and then increases in the opposite direction as 'r increases from root to tip. Therefore, the blade 32 is twisted in a spanwise direction in order to both minimize induced drag of the aircraft and to maintain the angle of attack in the low drag range of the airfoil section. To accomplish this, the twist angle $\gamma_I$ at the blade inboard portion is in the opposite direction to the twist angle $\gamma_0$ at the blade outboard portion. More specifically, as shown in FIG. 3, by measuring angles $\gamma_1$ and $\gamma_0$ from the reference line 56 at those locations, and assuming an angle formed above the reference line 56 is positive while an angle formed below the reference plane is negative, it can be seen that twist angles $\gamma_1$ and $\gamma_0$ have opposite signs. In an exemplary embodiment shown in FIG. 4, the rotor 28 is mounted to an aircraft wingtip. This is accomplished by rigidly mounting the shaft 30 to the aircraft wing so that it extends rearward of the wing trailing edge at a location adjacent the wingtip and in the proximate location of the axial center of the tip vortex. The rotor hub 34 is rotatably mounted on the shaft 30 so that the blades rotate about the approximate location of the axial center of the trailing edge vortex. It is preferable to mount the rotor 28 aft of the aircraft wing rather than forward of the aircraft wing in order to minimize any disturbance of the airflow over the wing.

Figure 4:
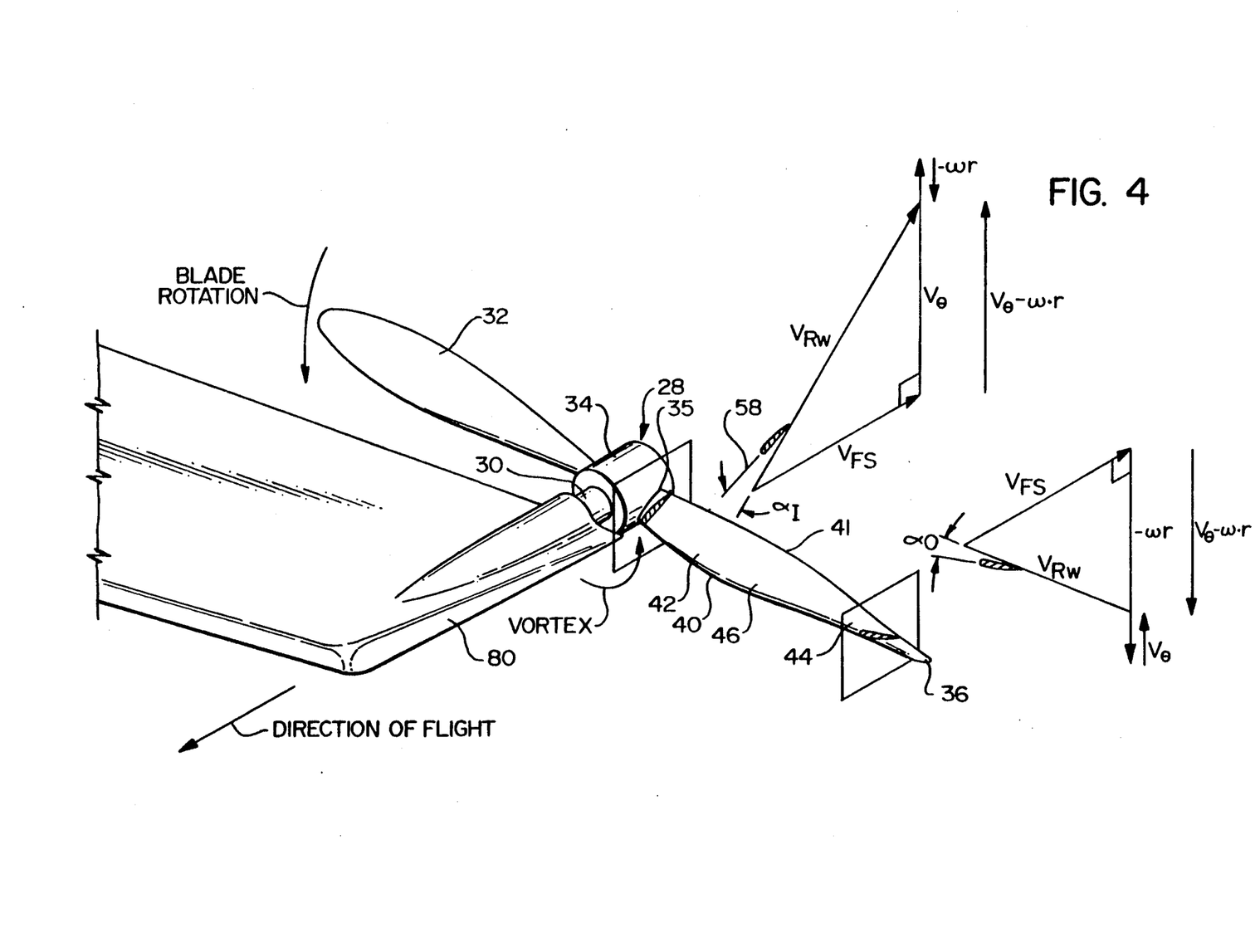
FIG. 4 is an isometric view showing an exemplary rotor mounted to an aircraft port wingtip, as well as diagrams of vector components representing $V_\theta$, $w \cdot r$, $V_{\theta-w \cdot r}$, as well as the free stream velocity, $V_{FS}$, and relative wind velocity, $V_{RW}$, at inboard and outboard locations on the rotor blade. In this and all other diagrams of vector velocity components, the incremental velocity components induced by the helical vortical structure shed by a rotor have been deleted for simplicity. These components are generally small.

In the exemplary embodiment of the present invention shown in FIG. 4, the rotor 28 is mounted proximate to an aircraft port wingtip 80. To achieve optimum rotor performance, each blade is twisted in a manner such that for the blade whose instantaneous position is most outboard, the chordlines of every chordwise cross section of the inboard blade portion 42 extend upward and rearward from the leading edge 40 to the trailing edge 41. (The term "up" or "upward", used in reference to the blade 32, is intended to refer to the location of the blade 32 when it is at the further outboard location where the blade is moving upwardly. Obviously when the blade 32 rotates 180° so as to be at an inboard location and is rotating downwardly, the terms "up" and "upward" would not apply.) This is seen by looking spanwise along the blade 32 from the tip 36 in a direction inboard toward the aircraft fuselage. The blade 32 is further formed so that the chordlines of every chordwise cross section of the outboard blade portion 44 extend downward and rearward from the leading edge to a trailing edge. In this manner, the blade inboard portion maintains an angle of attack, $a_I$ with the relative wind, $V_{RW}$, to generate a lift component (see FIG. 6B) for driving the rotor 28 in the direction of its rotation about its axis; that is, the inboard blade portion acts as an air-driven turbine. On the other hand, force components acting on the outboard blade portion 44 (see FIG. 8B) tend to resist its rotation; that is, the outboard blade portion 44 acts as a propeller which is driven by the inboard blade portion 42.

To show that the twisted blade 32 of the port rotor 28 generates thrust for induced drag recovery, reference is made to the vector diagrams of FIG. 4 in which induced velocity increments due to the influence of the helical wake shed by the rotor have been deleted for simplicity. The vortex from the port wingtip 80 swirls in a counterclockwise direction when looking aft. At the inboard blade portion 42, the air free stream velocity is represented by the rearward vector $V_{FS}$, while the large transverse component of vortex velocity is represented by the upward vector, $V_\theta$, and the relatively small transverse component of blade velocity is represented by the upward vector, $\omega \cdot r$; the difference between $V_\theta$ and $\omega \cdot r$ being represented by the transverse component of relative wind, $V_{\theta - \omega \cdot r}$. The relative wind as seen by the inboard blade portion 42 is the resultant vector sum, $V_{RW}$, of the free stream velocity vector, $V_{FS}$, and the transverse component of relative wind velocity vector. Due to the angle of attack, $a_I$, which is formed by the intersection of the wing chordline 58 and the relative wind vector, $V_{RW}$, lift is generated at the blade inboard portion for rotating the rotor 28 in the direction of the vortex (see FIG. 6B). A component of the lift also produces a thrust force.

Moving in a spanwise outward direction on blade 32 where $V_\theta$ is decreasing and $\omega \cdot r$ is increasing, it can be seen that near the blade intermediate portion 46 (FIG. 5) there is a spanwise location where velocity, $V_\theta$, is equal to blade velocity $\omega \cdot r$. At this location the transverse component of relative wind passes through zero, and the relative wind velocity vector is aligned with the air free stream velocity.

Referring again to FIG. 4, at further spanwise locations on the blade outboard portion 44, the transverse component of relative wind increases in the opposite direction, i.e. changes sign from that of the inboard blade portion 42, due to the increasing velocity, $\omega \cdot r$, and decreasing velocity $V_\theta$. By observing the vector diagrams of FIGS. 2, 4, 5, and 6, it can be seen that the relative wind vector $V_{RW}$ changes direction as the spanwise distance r from the hub increases. Thus, to maintain an appropriate angle of attack at spanwise locations across the blade, the blade is twisted so that the inboard twist angle, $\gamma_I$, is a maximum at the root and decreases to zero with increasing spanwise distance r; whereas the outboard twist angle $\gamma_O$ increases from zero in the opposite direction with increasing spanwise distance r and is at maximum at the blade tip 36.

Figure 6A:
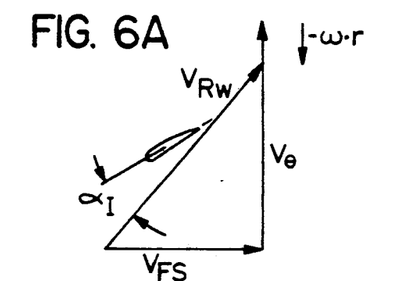
FIG. 6A is a diagram of vector components representing $V_\theta$, $V_{FS}$, $\omega \cdot r$, $V_{\theta-\omega \cdot r}$, at an inboard location on the blade.
Figure 6B:
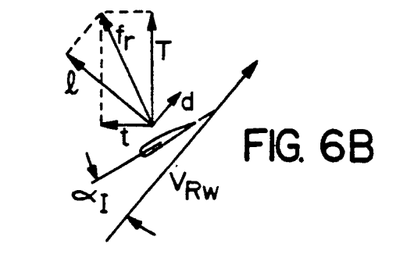
FIG. 6B is a diagram of vector components representing lift 1, drag d, thrust t, total force $f_r$ and circumferential force T at the inboard location on the blade.
Figure 7A:
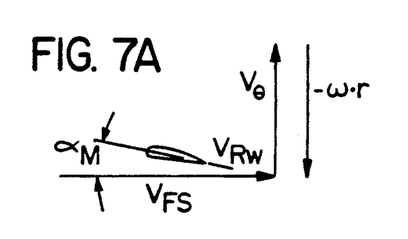
FIG. 7A is similar to FIG. 6A and shows a vector diagram of the components described with reference to FIG. 6A at an intermediate location on the blade.
Figure 7B:
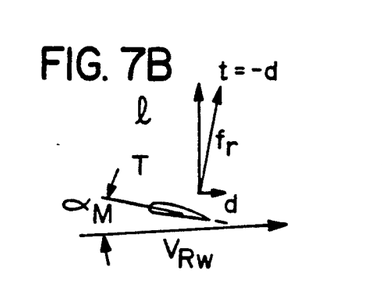
FIG. 7B is a vector diagram of the components described with reference to FIG. 6B at the intermediate location on the blade.
Figure 8A:
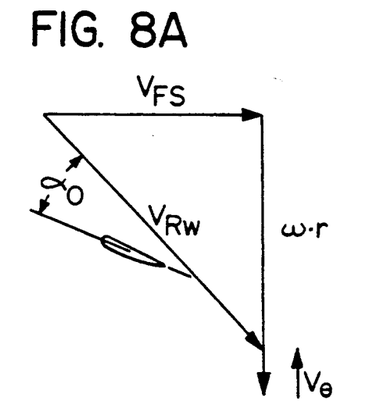
FIG. 8A is a vector diagram of the components described with reference to FIG. 6A at an outboard location on the blade.
Figure 8B:
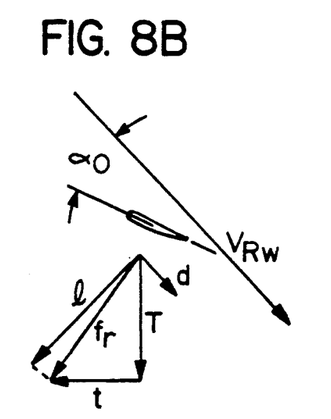
FIG. 8B is a vector diagram of the components described with reference to FIG. 6B at the outboard location on the blade.

To show that the aforementioned twisted blade recovers a portion of the induced drag by generating thrust across the blade, reference is made to the vector diagrams of FIGS. 6 through 8. More specifically, while FIG. 6A repeats the blade inboard vector diagrams shown in FIG. 4, in FIG. 6B there is shown the sectional lift, drag and thrust vectors generated at the blade inboard portion 42. Sectional lift, 1, which is perpendicular to $V_{RW}$, and sectional drag, d, which is parallel to $V_{RW}$, are components of a resultant force vector $f_r$. A component of $f_r$ which is opposite to the free stream component $V_{FS}$ is the sectional thrust vector t. It can be seen that the net axial component of force generated by the blade inboard portion is a thrust component in spite of the fact that it is operating as a turbine. This is because the blade inboard portion 42 is operating in a flow field having a large transverse velocity $V_\theta$. The component of $f_r$ in the circumferential direction on the blade inboard portion, denoted as T, provides a driving force on the rotor, which is counteracted by a retarding force on the blade outboard portion. When the rotor is allowed to freewheel, its RPM will stabilize at the value that balances the driving force on the inboard blade and the retarding force on the outboard blade.

Turning now to FIG. 7, while FIG. 7A repeats the blade intermediate portion vector diagram of FIG. 5, there is shown in FIG. 7B the vector components of section lift, section thrust, section drag, total force and circumferential force. At a determinable location of the intermediate portion 46, the force, $f_r$ is nearly perpendicular to the direction of aircraft flight and provides a component for driving the rotor 28, but not for generating thrust t. As shown by FIG. 7B, the resulting thrust or drag component is small.

However, as shown in FIG. 8B (FIG. 8A repeating the blade outboard portion vector diagram of FIG. 4), at the blade outboard portion 44 the sectional force component $f_r$ generated by the angle of attack of the blade outboard portion has a thrust component t, and a circumferential retarding component T that is balanced by the circumferential driving component on the inboard blade.

In this manner it is shown that except for the area of the blade adjacent to the relative wind zero location where $V_\theta = \omega \cdot r$, thrust is generated over the span of the blade. This aircraft thrust t constitutes the induced drag recovery from the wingtip vortex. The inboard blade portion contributes a driving torque which is balanced by an opposite torque on the outboard blade when the rotor is allowed to freewheel.

It should be clear therefore that the blade 32 is formed in a manner to generate section thrust over much of the blade area, with the only non-thrusting area of the blade occurring near the spanwise radius at which the direction of the transverse component of relative wind changes sign. Therefore, the blade is twisted so that it operates as a turbine when the transverse component of relative wind has one sign, and as a propeller when the transverse component of relative wind is of the opposite sign.

By optimizing the blade twist angle, there is no need to recover work generated by the rotor. Conventionally this is done by a generator or the like, which is mounted in the aircraft. In the preferred embodiment of the present invention, however, the rotor 28 freewheels on the shaft with the net torque generated by the blade inboard portion being equal and opposite to the net torque generated by the blade outboard portion so that no net torque is generated by the blade. As discussed previously, the induced drag recovery in the present invention is in the form of thrust generated by the freewheeling rotor.

It is preferable that the blade zero incidence point, i.e. that point where $y_M=0$ (see FIG. 4), this also being designated as the intermediate spanwise location, and also the force crossover point, be located outboard of a midspan point which is equidistant between the axis of rotation and the blade tip. This is because for the rotor 28 to freewheel at a steady state velocity, the net torque generated by the blade outboard portion must balance the net torque generated by the blade inboard portion. Since the moment exerted by a force generated toward the tip is greater than the moment of a force generated toward the root, this will result in a blade force crossover point that is somewhat outboard of the midspan points.

To review briefly the configuration of each blade 32 at the intermediate portion of the blade, there is the zero incident point where $\gamma_M$ equals zero, and this is the location shown in FIG. 3. At the location of the blade zero incidence point, the blade 32 is contoured so as to generate a lift in the direction of rotation so that at the zero incidence point where $\gamma_M$ equals zero, the blade 32 is still acting as a turbine. The location "z" (see FIG. 2) where the vortex velocity, $V_\theta$, equals the rotational speed of the propeller, $\omega_R$, also being shown in FIG. 5, is located a short distance outboard of the zero incidence point location $\gamma_M$, then the blade force crossover point occurs a further short distance outboard of the location "z" point. This arrangement could be modified, depending in various factors.

It is to be understood that for the rotor 28 located at the opposite outboard tip 90 of the right wing, the geometry of the blades 32 would simply be reversed, the reason for this being that the vortex generated at the right outboard tip 90 would be in an opposite direction (i.e., in a clockwise direction as viewed from the front) than the direction of the vortex generated at the left outboard wing location.

It should be appreciated that the amount of twist as represented by twist angles $\gamma_I$, $V_0$ (FIG. 3), to achieve optimum induced drag recovery will vary depending upon the aircraft flight conditions. For example the air free stream velocity vector, $V_{FS}$, will vary as a function of aircraft airspeed, whereas velocity, $V_\theta$, will vary as a function of the lift generated by the aircraft wing. In an exemplary embodiment, it is desirable to variably control the pitch of the blades (analogous to a conventional variable pitch propeller) to optimize induced drag recovery for the instantaneous flight condition of the aircraft.

In order to further optimize induced drag recovery it is desirable to vary the pitch of the blades, as a function of the angular position of the blade in its rotation about the axis 38 (in a manner analogous to the cyclic pitch of a conventional helicopter rotor). This is because the transverse flow field may not be uniform about the axis of rotation, creating a variation in loading on the blades as they rotate whose effect can be minimized by varying the blade pitch as a function of its cyclic position.

The means to vary the pitch of the blade is indicated schematically in FIG. 3 by the rectangle 34a. Such devices are well known in the prior art, so there will be no description of such a device herein, and this device 34a can be incorporated in the hub 34 of the propeller blades 32.

It will also be appreciated that the present invention can be used to generate thrust when placed in or near the core of any vortex in a flow field. It need not be restricted just for use in the vortex shed by a wingtip.

When the present device is allowed to freewheel on its shaft immersed in the core of a vortex emanating from upstream, the device will experience a thrust force which can be interpreted as a recovery of induced drag. Conventional "Trefftz plane" theory equates the kinetic energy remaining in crossflow planes downstream in the far wake behind the apparatus to the work done by the vehicle, which is the product of its forward velocity and the induced drag. The influence of the present device is exhibited in the Trefftz plane by a lessening of the kinetic energy of the crossflow within the cylindrical confines of the wake of the rotor. The action of the rotor can be viewed as one of redistributing the concentrated vorticity contained within the wing tip vortex and surrounding field, which has a high level of crossflow kinetic energy, into a field wherein the vorticity is distributed throughout the confines of the cylindrical wake of the rotor and having a lower level of crossflow kinetic energy. (It will be noted that a rotor creates no net trailing vorticity. It can act as a vorticity redistribution device by shedding vorticity of one sign at some spanwise location and vorticity of another sign at another spanwise location, but it creates no net trailing vorticity.)

In the preferred embodiment of the present invention the rotor freewheels on its shaft. From the principal of conservation of angular momentum, it is clear that the presence of the rotor cannot change the net angular momentum of the streamtube of air captured by the rotor. However, the rotor does cause a redistribution of the angular momentum across the radius of the streamtube. The maximum recovery of induced drag with a freewheeling rotor will occur when the angular momentum within the captured streamtube is redistributed so as to minimize the crossflow kinetic energy within the captured streamtube. This will occur when the action of the freewheeling rotor is to cause the air downstream of the rotor to achieve what is termed "solid body rotation" wherein each particle of air is undergoing the same rotational velocity.

It is thus apparent that a freewheeling rotor can only recapture the amount of kinetic crossflow energy that results in solid body rotation of the captured streamtube, and this cylinder of fluid rotating like a solid body does contain some residual crossflow kinetic energy.

It is also apparent that if the rotor is allowed to absorb a net torque, then the angular momentum of the streamtube of air passing through the rotor can be changed. In particular, there exists a certain amount of torque which, if absorbed by the rotor, will eliminate the net angular momentum of the captured streamtube. With a properly designed rotor with twisted blades, this can also further reduce the crossflow kinetic energy of the captured streamtube and hence result in a further recovery of induced drag. In most applications, the penalty in weight and complexity associated with recovery of energy through, say, a generator driven by the torque absorbed by the rotor outweighs the advantage of additional drag recovery and the production of energy, but the present invention does anticipate and contemplate this embodiment. It is obvious that various modifications can be made without departing from the basic teachings of the present invention.

What is claimed is:

1. An apparatus for drag recovery from a vortex where the vortex has a vortex center axis and a direction of vortex rotation about said vortex center axis, said apparatus comprising:
    a. a propeller means which has a center of rotation;
    b. means to rotatably mount said propeller means with an axis of rotation generally aligned with, and proximate to, the vortex center axis;
    c. said propeller means having an operating rotational speed, and also having a direction of propeller rotation which is the same as said direction of vortex rotation, said propeller means comprising:
        i. an inboard portion closer to said axis of rotation an being contoured and positioned so as to develop, when said propeller means is rotating at said operating rotational speed, a first rotational aerodynamic net force component driving said propeller means in said direction of propeller rotation;
        ii. an outboard portion further from said axis of rotation and being contoured and positioned so as to develop, when said propeller means is rotating at said operating rotational speed, a second rotational aerodynamic net force component opposing rotation of said propeller means in said direction of propeller rotation, and creating a net forward thrust.

2. The apparatus as recited in claim 1, wherein said propeller means is mounted for freewheeling rotation, and said first and second rotational force components substantially balance one another.

3. The apparatus as recited in claim 2, wherein said propeller means is arranged so as to develop an axial thrust component parallel to said axis of rotation.

4. The apparatus as recited in claim 1, wherein said propeller means is arranged so that when said propeller means is rotating at said operating rotational speed, said propeller means develops a thrust component parallel to said axis of rotation.

5. The apparatus as recited in claim 1, wherein said propeller means has a force crossover location spaced radially outwardly from said axis of rotation, with said propeller outboard portion being radially outwardly of said force crossover location and said propeller inboard portion being located radially inwardly of said force crossover location, said propeller means also having zero incidence propeller location where a chordwise axis of said propeller means is parallel to said axis of rotation, said zero incidence propeller location being located radially inwardly of said force crossover location.

6. The apparatus as recited in claim 5, wherein said propeller means has a relative wind zero location where a rotational velocity component at said propeller means is substantially equal to a rotational velocity component of said vortex at said relative wind zero location, said relative wind zero location being located radially outwardly from said force crossover location.

7. The apparatus as recited in claim 5, wherein said propeller means has a relative wind zero location where a rotational velocity component at said propeller means is substantially equal to a rotational velocity component of said vortex at said relative wind zero location, said relative wind zero location being located radially inwardly of said zero incidence propeller location.

8. The apparatus as recited in claim 1, wherein said vortex is generated at an outboard wing location, and said means to rotatably mount said propeller means is located rearwardly of and proximate to said outboard end of the wing.

9. The apparatus as recited in claim 1, further comprising means to vary pitch of said propeller means.

10. The apparatus as recited in claim 1, further comprising means to vary pitch of said propeller means during a cycle of rotation of said propeller means to accomplish cylic pitch so as to optimize propeller action.

11. An apparatus for drag recovery from a vortex where the vortex has a vortex center axis and a direction of vortex rotation about said vortex center axis, said apparatus comprising
    a. a propeller means which has a center axis of rotation;
    b. means to rotatably mount said propeller means with said axis of rotation generally aligned with and proximate to the vortex center axis;
    c. said propeller means comprising blade means having a leading edge, a trailing edge, a spanwise axis, and a chordwise axis which varies angularly relative to said axis of rotation from a radially inward location to a radially outward location, with said chordwise axis making with an adjacent line parallel to said axis of rotation a reference angle, said propeller means being arranged to rotate in a propeller direction of rotation which is the same as a direction of vortex rotation, said blade means comprising;
        i) an inboard blade section where the chordwise axis of the blade means extends from said trailing edge portion in a direction which is forward and opposite to the propeller direction of rotation, with the reference angle of the inboard section decreasing in a radially outward direction;
        ii) an outboard section where the chordwise axis extends from the trailing edge of the blade means in a direction which is forward and toward the propeller direction of rotation, said reference angle increasing in the outboard section in a radially outward direction;
    d. said propeller means being arranged so that at least a substantial portion of the inboard section is so configured and has an angle of attack such that with said propeller means rotating at an operating rotational speed, said inboard section acts as a turbine and drives said propeller means in the propeller direction of rotation, said outboard section being arranged in a manner that a substantial portion thereof is so contoured and has an angle of attack such that with the propeller means rotating at the operating rotational speed, at least a substantial portion of said outboard section resists rotation of said propeller means in said propeller direction of rotation; and e) said propeller means being arranged so that with the propeller means rotating at said operating rotational speed in said propeller direction of rotation, said propeller means creates a net forward thrust.

12. The apparatus as recited in claim 11, wherein said propeller means is mounted for freewheeling rotation, and first and second rotational force components created by said inboard and outboard sections substantially balance one another.

13. The apparatus as recited in claim 12, wherein said propeller means is arranged so as to develop an axial thrust component parallel to said axis of rotation.

14. The apparatus as recited in claim 11, wherein said propeller means is arranged so that when said propeller means is rotating at said operating rotational speed, said propeller means develops a thrust component parallel to said axis of rotation.

15. The apparatus as recited in claim 11, wherein said propeller means has a force crossover location spaced radially outwardly from said axis of rotation, with said outboard blade section being radially outwardly of said force crossover location and said inboard blade section being located radially inwardly of said force crossover location, said propeller means also having zero incidence propeller location where a chordwise axis of said blade means is parallel to said axis of rotation, said zero incidence propeller location being located radially inwardly of said force crossover location.

16. The apparatus as recited in claim 15, wherein said propeller means has a relative wind zero location where a rotational velocity component at said propeller means is substantially equal to a rotational velocity component of said vortex at said relative wind zero location, said relative wind zero location being located radially outwardly from said force crossover location.

17. The apparatus as recited in claim 15, wherein said propeller means has a relative wind zero location where a rotational velocity component at said propeller means is substantially equal to a rotational velocity component of said vortex at said relative wind zero location, said relative wind zero location being located radially inwardly of said zero incidence propeller location.

18. The apparatus as recited in claim 11, wherein said vortex is generated at an outboard wing location, and said means to rotatably mount said propeller means is located rearwardly of and proximate to said outboard end of the wing.

19. The apparatus as recited in claim 11, further comprising means to vary pitch of said propeller means.

20. The apparatus as recited in claim 11, further comprising means to vary pitch of said propeller means during a cycle of rotation of said propeller means to accomplish cylic pitch so as to optimize propeller action.

21. A method for drag recovery from a vortex where the vortex has a vortex center axis and a direction of vortex rotation about said vortex center axis, said method comprising:
   a. providing a propeller means which has a center of rotation and to rotatably mounting said propeller means with an axis of rotation generally aligned with, and proximate to, the vortex center axis so that said propeller means rotates at an operating rotational speed in a direction of propeller rotation which is the same as said direction of vortex rotation;
   b. said propeller means being characterized in that it comprises:
      i. an inboard portion closer to said axis of rotation and being contoured and positioned so as to develop, when said propeller means is rotating at said operating rotational speed, a first rotational aerodynamic net force component driving said propeller means in said direction of propeller rotation;
      ii. an outboard portion further from said axis of rotation and being contoured and positioned so as to develop, when said propeller means is rotating at said operating rotational speed, a second rotational aerodynamic net force component opposing rotation of said propeller means in said direction of propeller rotation, and creating a net forward thrust.

22. The method as recited in claim 21, wherein said propeller means is mounted for freewheeling rotation, and said first and second rotational force components substantially balance one another.

23. The method as recited in claim 22, wherein said propeller means is arranged so as to develop an axial thrust component parallel to said axis of rotation.

24. The method as recited in claim 21, wherein said propeller means is arranged so that when said propeller means is rotating at said operating rotational speed, said propeller means develops a thrust component parallel to said axis of rotation.

* * * * *